(12) United States Patent
Krishnamurthy et al.

(10) Patent No.: US 8,484,243 B2
(45) Date of Patent: Jul. 9, 2013

(54) ORDER-INDEPENDENT STREAM QUERY PROCESSING

(75) Inventors: Saileshwar Krishnamurthy, Palo Alto, CA (US); Michael R. Lewis, San Francisco, CA (US); Wing Li, Foster City, CA (US); Neil Thombre, Santa Clara, CA (US); Jeffrey A. Davis, Santa Clara, CA (US); Daniel Robert Farina, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 13/101,967

(22) Filed: May 5, 2011

(65) Prior Publication Data

US 2011/0302164 A1 Dec. 8, 2011

Related U.S. Application Data

(60) Provisional application No. 61/331,801, filed on May 5, 2010.

(51) Int. Cl.
*G06F 17/30* (2006.01)
(52) U.S. Cl.
USPC .......................................................... 707/771
(58) Field of Classification Search
USPC ................... 707/713–720, 760–781
See application file for complete search history.

(56) References Cited

U.S. PATENT DOCUMENTS

| 7,984,043 | B1* | 7/2011 | Waas | 707/718 |
| 8,195,712 | B1* | 6/2012 | McCormick | 707/803 |
| 2002/0176431 | A1* | 11/2002 | Golla et al. | 370/412 |
| 2004/0260671 | A1* | 12/2004 | Potter et al. | 707/1 |
| 2005/0235030 | A1* | 10/2005 | Lauckhart et al. | 709/200 |
| 2006/0218123 | A1* | 9/2006 | Chowdhuri et al. | 707/2 |
| 2008/0177770 | A1* | 7/2008 | Friedlander et al. | 707/101 |
| 2008/0183688 | A1* | 7/2008 | Chamdani et al. | 707/4 |
| 2008/0189251 | A1* | 8/2008 | Branscome et al. | 707/3 |
| 2008/0189252 | A1* | 8/2008 | Branscome et al. | 707/3 |
| 2008/0255847 | A1* | 10/2008 | Moriwaki et al. | 704/270.1 |
| 2009/0100014 | A1* | 4/2009 | Gedik et al. | 707/3 |
| 2009/0210401 | A1* | 8/2009 | Kaufman, Jr. | 707/4 |

(Continued)

OTHER PUBLICATIONS

Altinel, Mehmet et al. "Cache Tables: Paving the Way for an Adaptive Database Cache." Proceedings of the 29th VLDB Conference, Berlin, Germany, 2003.

(Continued)

*Primary Examiner* — Wilson Lee
(74) *Attorney, Agent, or Firm* — Hickman Palermo Truong Becker Bingham Wong LLP

(57) ABSTRACT

In a system and method for order-independent stream query processing, one or more input streams of data are received, and the one or more input streams are analyzed to determine data which is older than an already emitted progress indicator. The data which is older than the already emitted progress indicator is partitioned into one or more partitions, and each of the one or more partitions are independently processed using out-of-order processing techniques. A query is received, rewritten and decomposed into one or more sub-queries that produce partial results for each of the one or more partitions, where each of the one or more sub-queries correspond to a partition. A view is also produced that consolidates the partial results for each partition. The partial results are consolidated at a consolidation time specified by the query to produce final results, and the final results are provided.

24 Claims, 11 Drawing Sheets

U.S. PATENT DOCUMENTS

| | | | |
|---|---|---|---|
| 2009/0228434 A1 | 9/2009 | Krishnamurthy et al. | |
| 2009/0228465 A1 | 9/2009 | Krishnamurthy et al. | |
| 2009/0248631 A1* | 10/2009 | Alba et al. | 707/3 |
| 2009/0254516 A1* | 10/2009 | Meiyyappan et al. | 707/2 |
| 2009/0254532 A1* | 10/2009 | Yang et al. | 707/4 |
| 2009/0254774 A1* | 10/2009 | Chamdani et al. | 714/2 |
| 2009/0319486 A1* | 12/2009 | Surlaker et al. | 707/3 |
| 2009/0319550 A1* | 12/2009 | Shau et al. | 707/101 |
| 2010/0005077 A1* | 1/2010 | Krishnamurthy et al. | 707/4 |
| 2010/0070448 A1* | 3/2010 | Omoigui | 706/47 |
| 2010/0106724 A1* | 4/2010 | Anderson | 707/737 |
| 2010/0106934 A1* | 4/2010 | Calder et al. | 711/173 |
| 2011/0131199 A1* | 6/2011 | Simon et al. | 707/714 |

OTHER PUBLICATIONS

Franklin, Michael J. et al. "Design Considerations for High Fan-in Systems: the HiFi Approach." Proceedings of the 2nd CIDR Conference, Asilomar, California, 2005.

Krishnamurthy, Sailesh et al. "On-the-Fly Sharing for Streamed Aggregation." SIGMOD Conference 2006, Chicago, Illinois, Jun. 27-29, 2006.

Krishnamurthy, Sailesh et al. "The Case for Precision Sharing." Proceedings of the 30th VLDB Conference, Toronto, Canada, 2004.

Krishnamurthy, Sailesh et al. "Shared Hierarachical Aggregation for Monitoring Distributed Streams." Report No. UCB/CSD-05-1381. Computer Science Division, University of California, Berkeley, Oct. 18, 2005.

Chandrasekaran, Sirish et al. "TelegraphCQ: Continuous Dataflow Processing for an Uncertain World." Proceedings of the 1st CIDR Conference, Asilomar, California, 2003.

Krishnamurthy, Sailesh et al. "Telegraph CQ: An Architectural Status Report." Bulletin of the IEEE Computer Society Technical Committee on Data Engineering, Nov. 18, 2003.

Krishnamurthy, Saileshwar. "Shared Query Processing in Data Streaming Systems." A dissertating submitted in partial satisfaction of the requirements for the degree of Doctor of Philoshophy in Computer Science in the graduate division of the University of California, Berkeley. Fall 2006.

Krishnamurthy, S., "Shared Query Processing in Data Streaming Systems" Fall 2006 (212 pages).

* cited by examiner (PRIOR ART)

```
select    count(*), cq_close(*) t
from      S <slices '5 minutes'>
```

| Row Num | Input Data | Control | Count State | Output Tuple |
|---|---|---|---|---|
| 1 | 1 | | 1 | |
| 2 | 3 | | 2 | |
| 3 | 2 | | 3 | |
| 4 | 4 | | 4 | |
| 5 | 2 | | 5 | |
| 6 | 1 | | 6 | |
| 7 | | 5 | | (6,5) |
| 8 | 6 | | 1 | |
| 9 | 2 | | 1 | |
| 10 | 9 | | 2 | |
| 11 | 7 | | 3 | |
| 12 | 3 | | 3 | |
| 13 | | 10 | | (3,10) |
| 14 | 12 | | 1 | |
| 15 | 8 | | 1 | |
| 16 | 4 | | 1 | |
| 17 | 3 | | | |
| 18 | 9 | | | |
| 19 | | 15 | | (1,15) |

Fig. 3

```
            select   count(*), cq_close(*) t
            from     S <slices '5 minutes'>
Row     Input        State Partitions        Output
Num     Data Ctrl    part-1 part-2 part-3    Tuples
-----------------------------------------------------
 1       1            1
 2       3            2
 3       2            3
 4       4            4
 5       2            5
 6       1            6
 7            5                               (6,5)
 8       6            1
 9       2            1     1
10       9            2     1
11       7            3     1
12       3            3     2
13           10             2                 (3,10)
14      12            1     2
15       8            1     1                 (2,5)
16       4            1            1
17       3            1            2
18       9            2            2
19           15             2      2          (1,15)
20      flush-2                    2          (2,10)
21      flush-3                               (2,5)
```

Fig. 4

```
create stream impsns(
      user      int,
      campaign  int,
      price     int,
      ts        timestamp cqtime
);
create stream impsn_count as
  (select  campaign, count(*) c, cq_close(*) t
   from    impsns <slices '1 minute'>
   group by campaign)
archive into impsn_count_ar;
```

Fig. 5

```
create stream i_c_p as
  (select campaign, count(*) pc, cq_close(*) t
   from   impsns <slices '1 minute'>
   group by campaign) archive into i_c_p_ar;
```

Fig. 6

```
create view impsn_count as
   (select campaign, sum(pc) c, cq_close(*) t
    from    i_c_p <slices '1 minute'>
    group by campaign);

create view impsn_count_ar as
   (select campaign, sum(pc) as c, t
    from    i_c_p_ar
    group by campaign, t);
```

Fig. 7

```
create stream impsn_sum as
  (select sum(c) s, cq_close(*) t
   from    impsn_count <slices '1 min'>);
```

Fig. 8

```
create stream impsn_max as
  (select   max(c) m, cq_close(*) t
   from     impsn_count <slices '1 min'>)

create stream impsn_thresh as
  (select   campaign, sum(c) c, cq_close(*) t
   from     impsn_count <slices '5 min'>
   group by campaign
   having   sum(c) > 50);
```

Fig. 9

```
create stream impsn_count_5min as
  (select   campaign, count(*) c, cq_close(*) t
   from     impsns <slices '5 min'>
   group by campaign);
```

Fig. 10

```
create stream impsn_avg as
(select campaign, avg(price)p, cq_close(*) t
 from   impsn <slices '1 min'>
 group by campaign);

create stream impsn_avg_5min as
(select campaign, avg(price) p, cq_close(*) t
 from   impsn <slices '5 min'>
 group by campaign);
```

Fig. 11

```
create stream i_a_p as
(select campaign,avg_partial(p) p, cq_close(*) t
 from   impsns <slices '1 min'>
 group by campaign);

create stream i_a_p_5 as
(select campaign, avg_reduce(p) p, cq_close(*)t
  from  i_a_p <slices '5 min'>
  group by campaign);

create view impsn_avg as
(select campaign,avg_final(p) p,cq_close(*) t
 from   i_a_p <slices '1 min'>
 group by campaign);

create view impsn_avg_5min as
(select campaign, avg_final(c), cq_close(*) t
 from   i_a_p_5 <slices '5 min'>
 group by campaign);
```

Fig. 12

ORDER-INDEPENDENT STREAM QUERY PROCESSING

CROSS REFERENCE TO RELATED APPLICATIONS

This application claims the benefit of U.S. Provisional Application No. 61/331,801, filed on May 5, 2010, entitled "Continuous Analytics Invention Using Parallel Partial Processing," the disclosure of which is incorporated herein by reference.

BACKGROUND

1. Field of the Invention

The present invention relates generally to data stream query processing, and more particularly to stream processing that is independent of order.

2. Description of Related Art

Research and early commercial work in stream query processing viewed data streams as continuous sequences of data that arrived more or less in order. This assumption heavily influenced the architecture of first generation stream-processing systems. Such systems typically tolerate only small degrees of delay and out-of-orderness in the arrival of streaming data, and do so at the expense of introducing mandatory latencies and potentially expensive buffering into what should be high-speed, lightweight stream processing. In cases where the discontinuity of the input exceeds the limits that can be handled by such systems, the incoming data is often simply dropped, or at best, spooled to back-up storage for eventual (and often manual) integration into the system.

In practice, however, it turns out that streams are rarely continuous for several reasons. For example, in distributed environments, data from multiple sources can arrive in arbitrary order even under normal circumstances. Failure or disconnection followed by subsequent recovery of connectivity between remote sites causes even larger discontinuities as sites that have been down or disconnected for large periods of time finally wake up and start transmitting old, but important data. A similar pattern of events unfolds in the event of temporary disruptions such as network partitions between datacenters connected over WAN environments. Parallel execution techniques that are critical in scaling up and out in multi-core and cluster systems break the sequential/in-order nature of stream processing. Finally, high availability mechanisms for streaming systems, in which a recovering server must obtain missing data from other sites, create situations where data arrives piecemeal and not necessarily in order.

The problems described above are particularly acute in the emerging "Big Data" applications where stream processing systems are being increasingly used. Consider for example, the web-based digital media ecosystem of organizations delivering various services (e.g., social networking, advertising, video, mobile etc.) to internet-scale audiences. Such services operate in highly dynamic environments where monitoring and event data inherently arrives at multiple time-scales, and query results, analyses and predictions are needed across multiple time-scales. In such environments the source data is typically from log files spooled by large banks of distributed web/application servers. Failures in the source systems are commonplace and the log files are often delivered to the analytics system hours or sometimes days late. Finally, these services are more and more frequently deployed in cloud environments and have stringent availability requirements that must also be satisfied.

SUMMARY OF THE INVENTION

The present technology provides order-independent stream query processing. One or more input streams of data are received, and the one or more input streams are analyzed to determine data which is older than an already emitted progress indicator. The data which is older than the already emitted progress indicator is partitioned into one or more partitions, and each of the one or more partitions are independently processed using out-of-order processing techniques.

In an embodiment, a query is received, rewritten and decomposed into one or more sub-queries that produce partial results for each of the one or more partitions, where each of the one or more sub-queries correspond to a partition. A view is also produced that consolidates the partial results for each partition. The partial results are consolidated at a consolidation time specified by the query to produce final results, and the final results are provided.

A system for providing order-independent stream query processing may include one or more continuous query back ends, each continuous query back end being configured to receive a stream of data from a data source, analyze the stream of data to determine data which is older than an already emitted progress indicator, partition the data which is older than the already emitted progress indicator into one or more partitions, and independently process each of the one or more partitions using out-of-order processing techniques. Each continuous query back end may further be configured to divide the query into one or more sub-queries that produce partial results for each of the one or more partitions, each of the one or more sub-queries corresponding to a partition, and a view that consolidates the partial results for each partition. Each continuous query back end communicates the partial results to an executor thread, each of which dynamically consolidates partial results coming from multiple backends on a continuous basis.

Each continuous query back end may further be configured to divide the query into one or more sub-queries that produce partial results for each of the one or more partitions, each of the one or more sub-queries corresponding to a partition, and a view that consolidates the partial results for each partition. Each continuous query back end may also consolidate the partial results at a consolidation time specified by the query to produce final results. The system may further include one or more query back ends, the one or more query back ends receiving the final results from the one or more continuous query back ends via a continuous query executor.

Other aspects and advantages of the present invention can be seen on review of the drawings, the detailed description, and the claims which follow.

BRIEF DESCRIPTION OF THE DRAWINGS

FIG. 3 illustrates the use of a tumbling (i.e. non-overlapping) window count query with a window of 5 minutes.

FIG. 4 illustrates the use of order-independent partial processing using the data set shown in FIG. 3.

FIG. 5 illustrates exemplary scenario modeling click-stream data for online advertising with a raw stream.

FIG. 6 illustrates exemplary scenario of creating a derived stream of partial aggregations.

FIG. 7 illustrates exemplary consolidated streaming and static views.

FIG. 8 illustrates exemplary super-query that can be deployed in RB mode.

FIG. 9 illustrates exemplary queries that cannot be deployed in partial mode.

FIG. 10 illustrates an exemplary rollup of aggregates.

FIG. 11 illustrates an exemplary complex rollup.

FIG. 12 illustrates exemplary rewrites for complex rollups.

DETAILED DESCRIPTION

Figure 1A:
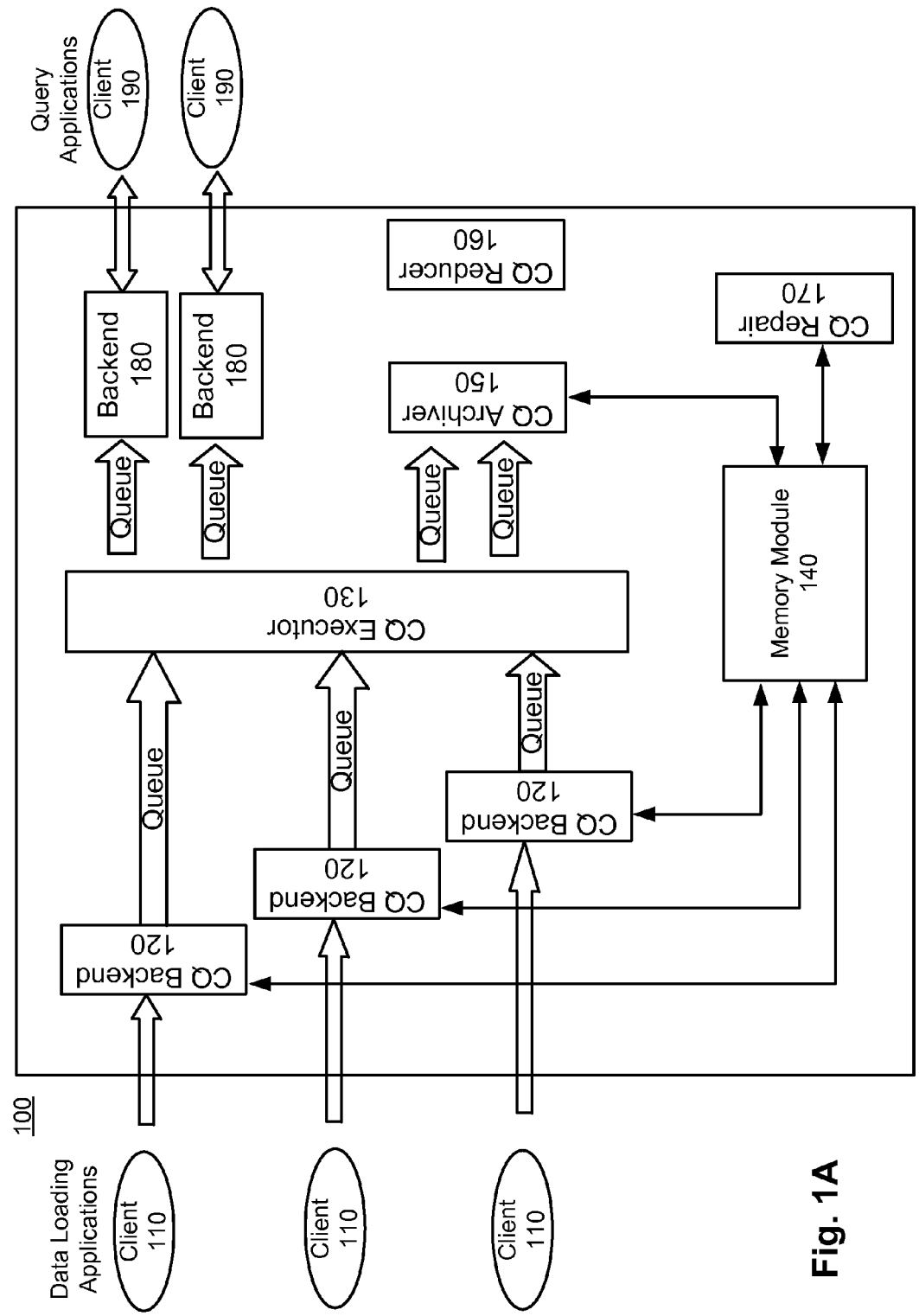
FIG. 1A is a block diagram illustrating an embodiment of system architecture which can be used to implement the techniques described herein.

Continuous analytics systems that enable query processing over steams of data have emerged as key solutions for dealing with massive data volumes and demands for low latency. These systems have been heavily influenced by an assumption that data streams can be viewed as sequences of data that arrived more or less in order. The reality, however, is that streams are not often so well behaved and disruptions of various sorts are endemic.

A unified approach toward continuous analytics over discontinuous streaming data is described herein. Approaches described herein use techniques so that queries can be performed over independent sub-streams with arbitrary time ranges in parallel, generating partial results. The consolidation of the partial results over each sub-stream can then be deferred to the time at which the results are actually used on an on-demand basis. A Continuous Analytics system as described herein implements this type of order-independent processing. Not only does the approach provide the first real solution to the problem of processing streaming data that arrives arbitrarily late, it also serves as a critical building block for solutions to a host of hard problems such as parallelism, recovery, transactional consistency, high availability, failover, and replication.

The approach described herein leverages properties of relational query processing and may also utilize functionality provided by Structured Query Language ("SQL") in some embodiments. Such an approach incorporates the flexibility of data parallel query processing mechanisms and uses sophisticated query rewriting techniques in order to hide the complexity of dealing with discontinuous streaming data from application developers and query writers.

The Continuous Analytics system described herein inherently supports the processing of discontinuous streams of data. Any data that arrives too late to be handled by traditional schemes represents a discontinuity and can be automatically partitioned and processed independently. This model of discontinuous streams maps much more naturally to the way streaming data arrives in large-scale deployments—chunks of data from individual log-files that are each mostly in order although they might arrive at widely disparate times.

The processing model described herein can greatly expand the environments and applications for which stream processing can be effective, and helps enable data management services that are typically not associated with streaming and other real-time systems. Once stream processing is freed from the assumption of continuous streams, many features may become more natural to implement, as these features inherently disrupt ordering. Specifically, beyond enabling the handling of data that arrives significantly out-of-order, the order-independent approach is used by the Continuous Analytics System described herein to support intra-query parallelism for both multi-core and cluster-based processing, fault tolerance based on rapid recovery in which a recovering instance can begin processing newly arriving data while it is still re-establishing its state, high Availability deployments where recovering or new instances can retrieve state information and missed data from running instances, and "bootstrapping" continuous queries in which queries over streams can first be run over historical data while catching up to the current stream.

The approach of the present technology may split the entire continuous query ("CQ") workload into a parallel phase that relies on partial processing and a serial phase that operates using a more traditional out-of-order processing ("OOP")-based approach. The steps for processing a continuous query may include automatically identifying the portions of the workload that are suitable for parallel versus serial processing, pushing down partial CQ processing to an input manager stage of the data loading pipeline, and combining or associating the results of concurrent partial processing to the traditional OOP-based serial processing.

In what follows, the term parallel processing ("PP") streams will be used for the raw and intermediate derived streams that are earmarked for the parallel phase, and serial processing ("SP") streams will be used for derived streams and other CQs that operate in the serial phase.

FIG. 1A is a block diagram illustrating an embodiment of system architecture which can be used to implement the techniques described herein. In the illustrated embodiment, the system 100 includes CQ backends 120, CQ executor 130, memory module 140, CQ archiver 150, CQ reducer 160, CQ repair 170, and back ends 180.

Clients 110 each provide data sources that can connect to the system 100 using standard protocols. Input streams are provided by the clients 110, and in some embodiments use bulk loading application programming interfaces ("APIs") to do so. The system 100 includes an associated CQ Backend 120, which can be a thread that is dedicated to each input stream. The CQ backend 120 may lazily instantiate a local data flow network of CQ operators appropriate for the input stream on which data arrives. The CQ operators have specifically been generated for the PP streams that correspond to a particular raw stream, and in turn produce runs of partial results. In addition, based on the specified DDL and query rewrites, the local data flow network is responsible for archiving into tables the raw data it processes as well as the corresponding PP results it produces as well as sending the PP data to the shared CQ executor for use in processing SP streams via shared memory queues. The CQ executor also receives similar data from Backend threads that services other data sources. Note that the CQ executor is part of a single very long-running transaction for its entire existence.

The CQ backend 120 may be used to perform archiving for PP partial results. Data archived by the CQ backend 120 may be stored in the memory module 140.

The CQ executor thread fetches PP records from input queues and processes them through a data flow network of CQ operators using the OOP techniques described earlier in Section 2.2. The CQ executor can itself exploit multiple available cores in the system by splitting either operators or entire queries across multiple threads. Finally the system also includes a CQ archiver thread that is responsible for writing out windows of data that were produced for SP streams by the CQ executor to tables, a CQ reducer thread that is responsible for eagerly combining partial results in the background, and a CQ repair thread that continually fixes the contents of archives of SP streams. Note that it is possible to implement several instances each of the executor, archiver, reducer and repair threads.

The memory module 140 may be any suitable storage structure, such as a database or data store located on a disk. The memory module 140 contains data from the one or more input streams, as well as derived streams produced in response to queries by the CQ backend 120 and/or the CQ archiver 150.

The CQ reducer module 160 may be configured to determine if the quantity of out-of-order data exceeds a predetermined threshold, in order to conserve space in the memory module 140. When the predetermined threshold is exceeded, the consolidating the partial results may be performed by deriving a partial aggregate, the partial aggregate including a partial state record for a partition.

Figure 1B:
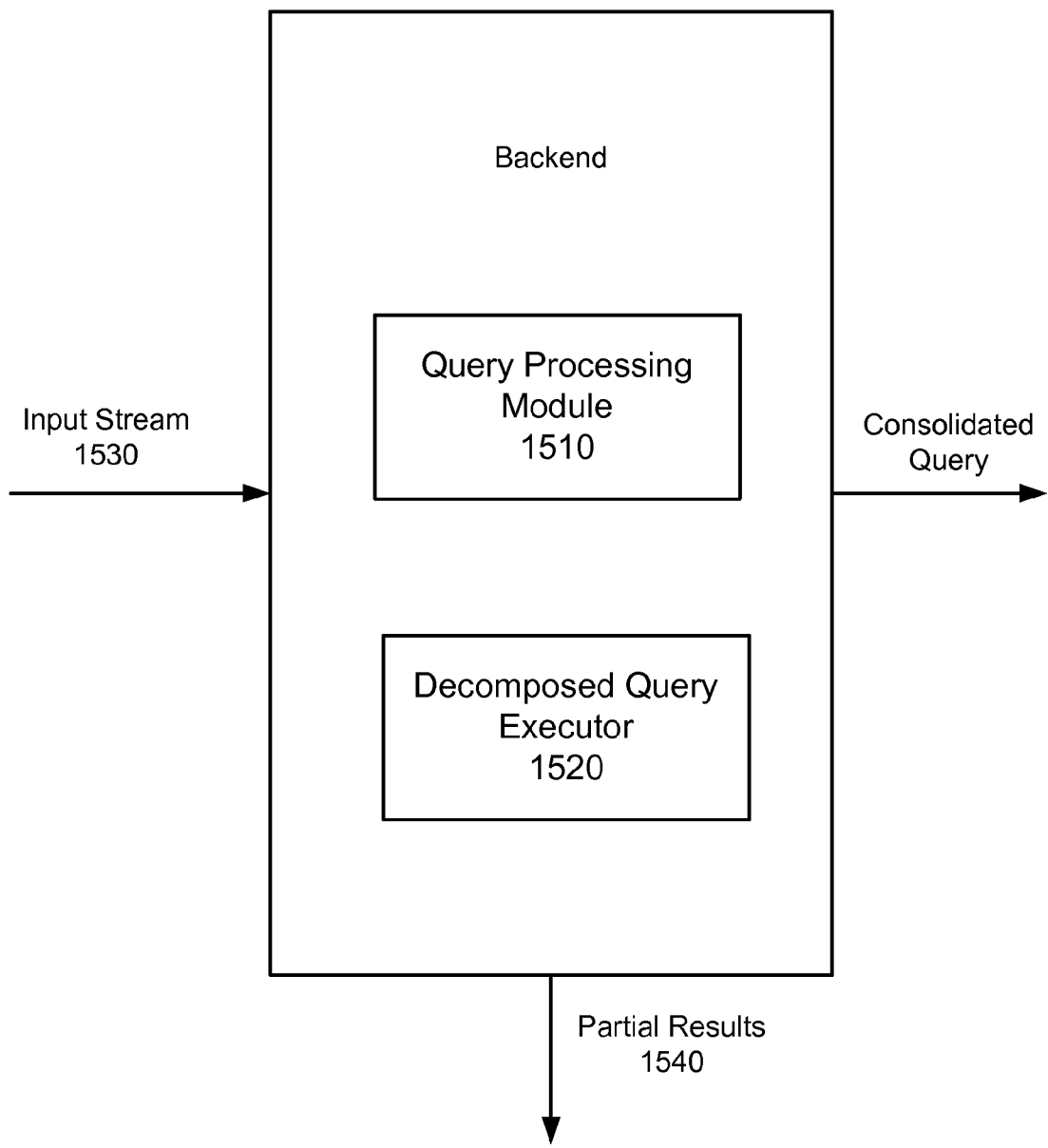
FIG. 1B is a block diagram illustrating an embodiment of a continuous query backend.

FIG. 1B is a block diagram illustrating an embodiment of a continuous query backend 120. CQ backend 195 may include a query processing module 1510 and a Decomposed Query Executor 1520. The query processing module 1510 may process receive queries, for example via an input stream, and decompose the queries. This is described in more detail below. Decomposed Query Executor 1520 may execute the decomposed queries. Hence, after a query has been decomposed, the query may be executed on the input stream to generate partial results, which may be transmitted to the memory module 140.

In embodiments where the query includes a serial portion, serial processing may need to be performed on the partial results 1540. In such situations, the decomposed query may be consolidated by the CQ backend 195 and transmitted as shown in FIG. 1B.

Figure 2:
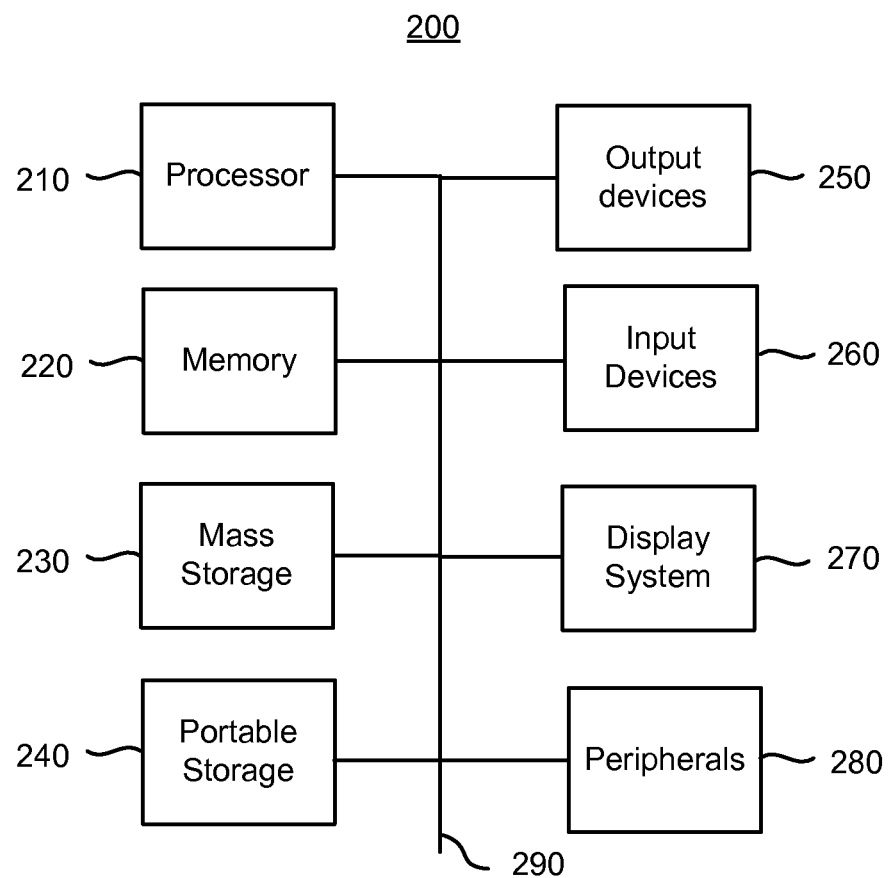
FIG. 2 illustrates an exemplary computing system which may be used to implement aspects of the present invention.

FIG. 2 illustrates an exemplary computing system 200 that may be used to implement aspects of the present invention. The computing system 200 includes one or more processors 210 and memory 220. Main memory 220 stores, in part, instructions and data for execution by processor 210. Main memory 220 can store the executable code when in operation. The system 200 further includes a mass storage device 230, portable storage medium drive(s) 240, output devices 250, user input devices 260, a graphics display 270, and peripheral devices 280.

The components shown in FIG. 2 are depicted as being connected via a single bus 290. However, the components may be connected through one or more data transport means. For example, processor unit 210 and main memory 220 may be connected via a local microprocessor bus, and the mass storage device 230, peripheral device(s) 280, portable storage device 240, and display system 270 may be connected via one or more input/output (I/O) buses.

Mass storage device 230, which may be implemented with a magnetic disk drive or an optical disk drive, is a non-volatile storage device for storing data and instructions for use by processor unit 210. Mass storage device 230 can store the system software for implementing embodiments of the present invention for purposes of loading that software into main memory 220.

Portable storage device 240 operates in conjunction with a portable non-volatile storage medium, such as a floppy disk, compact disk or Digital video disc, to input and output data and code to and from the computer system 200 of FIG. 2. The system software for implementing embodiments of the present invention may be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

Display system 270 may include a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that may be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

In contrast to the early systems that relied purely on in-order processing ("IOP") techniques, some systems employed independently developed variants of the OOP approach. The idea behind the OOP idiom is, where possible, to implement flexible and efficient query operators that can accept data out of order. For such operators to know when to emit results and purge state (e.g., when a window closes), a notion of stream progress is still required. The crux of the OOP technique is to provide this notion of stream progress at a system level without actually buffering or reordering the data. In such systems, stream progress is generally communicated using punctuations. Each individual operator is responsible for understanding these punctuations and for sending progress information to its downstream operators.

With this approach it is possible to implement certain types of operators in a way that is tolerant to moderate amounts of disorder in their input. For example, consider the tumbling (i.e., non-overlapping) window count query with a window of 5 minutes shown in FIG. 3, which operates over a stream of data with many records arriving slightly out of order, and where an input manager provides progress information on some heuristic basis. The "cq_close(*)" aggregate function returns the timestamp at the close of the relevant window. In the example there is a row for each input tuple (data or control) with columns depicting the timestamp of the tuple, the internal aggregate state for count, and the output tuple that is produced as and when control tuples arrive.

A smart order-agnostic aggregate implementation can accept the incoming data in any order and still accumulate it correctly. When the progress information indicates that a given window is closed the aggregate operator can emit its output for that window. In the first window of the example, although rows 3, 5, and 6 (with timestamps 2, 2, and 1 respectively) are out-of-order they are still counted correctly, and when the control tuple with timestamp 5 arrives an output tuple with value (6,5) is emitted.

As demonstrated previously (for example, by Li J., Tufte, K., Shkapenyuk, V., Papdimos, V., Johnson, T., Maier, D.

Out-of-Order Processing: A New Architecture for High-Performance Stream Systems. In Proc. VLDB Endowment (2008), 274-288), the advantages of such an approach are apparent—reduced memory and latency compared to the IOP approaches described above. In spite of these advantages, however, the OOP approach is fundamentally limited by the accuracy of the progress information that the input manager can construct. Any data that arrives sufficiently late, beyond an inferred or specified low water mark, will be discarded without being processed. Note that data can be discarded by a window operator on a per-query basis rather than by a system-wide input manager. For example, in FIG. 3 six of the sixteen data tuples arrive sufficiently late to be dropped. Furthermore, the incorrect results produced by this query will also affect the results of downstream queries. Suppose, for instance, the output of this query was being rolled up into a super-query computing a tumbling window count with a "15 minute" window (i.e., by summing up the three 5 minute totals produced here), the first output of the super-query will be (10,15) although there were actually 16 records in the 15 minutes.

In essence, order-dependent systems are ideal for processing streaming queries on mostly ordered input data with a design point that assumes that out-of-order tuples are only slightly late. This is a reasonable assumption in some environments such as the financial trading space (the initial market for pure streaming systems) where trading algorithms have such small windows of opportunity that handling very late data is not particularly helpful.

The requirements imposed by an order dependent system may be fundamentally unrealistic and unacceptable in most enterprise environments for several reasons. First, it can be very important to ensure that a streaming system correctly processes and accounts for every input tuple, no matter how late it arrives in the system, in order to preserve the integrity of stream histories. While this may be the case in the stream-relational model, it turns out that it is also true in pure streaming systems, which depend on the integrity of historical data either for replaying old data (e.g., for back-testing financial trading algorithms) or when comparing current results with a historical baseline in order to perform alerts.

In applications such as analytics over web/mobile/video, the data sources (web clients) are widely distributed and issue beacon requests in order to track activity. In such environments involving temporarily disconnected data sources it's quite impossible to infer any kind of progress information. For this reason, one of the biggest web-analytics vendors generally timestamps data on arrival to the system and cannot combine such data with previously time stamped data generated by disconnected clients.

It is extremely hard and quite impractical to deploy an order-dependent streaming system in a scalable and/or fault-tolerant cluster configuration. In such a configuration, data that is transferred between nodes can arrive significantly later than data that originated at a given node. Worse, in the event of a failure and subsequent recovery of a node, the newly recovered node needs to retrieve (from a peer) the data it missed during a crash, process that data, and only then "catch up" to live data—a process that requires a very complex and error-prone protocol. The fault-tolerant protocols developed as part of the Flux and Borealis systems are also quite complex for much the same reasons.

Due to the inherent limitations in the traditional Order-Dependent approach to stream query processing outlined in the preceding section, the present technology utilizes a unique approach to Order-Independent stream processing. This technique leverages some of the unique aspects of a hybrid "stream-relational" architecture.

The present stream-relational system can be used to manage historical as well as streaming data. The system supports two general classes of queries: (a) push-oriented live/continuous queries (CQs) that operate over either streams or a mix of streams and historical data stored in tables, and (b) pull-based static/snapshot queries (SQs) over historical data stored in tables. Note that the tables used to hold historical data are, in fact, full-blown SQL tables, so SQs are written in standard SQL, with all the bells and whistles allowed.

The central challenge in designing an order-independent system is what to do with very late data that arrives after a window closes. For cases where the techniques described in the previous section do not work, application-level remedies such as compensations may be used. One approach for this was described in Borealis (See, Abadi, D., Ahmad, Y., Balazinska, B., et al. The Design of the Borealis Stream Processing Engine. In CIDR 2005) where the system replays history to generate revisions of query results, which applications must then handle.

Most real applications involving data streams, however, involve result delivery across a wide range of time scales: real-time alerts and monitoring, periodic reporting on an hourly, daily or even longer basis, as well as on-demand reports and queries over historical data. Furthermore, even "real-time" queries used for monitoring alerting typically compare incoming data to historical trends. Data arriving very late can impact the correctness of all of these types of queries, resulting in long-term inaccuracies due to short-lived problems that frequently occur in data-intensive environments.

The goal of an order-independent system, therefore, is to maintain the integrity of raw and derived stream histories. That is, the effects of any tuple that arrives too late to handle using standard OOP techniques must eventually be reflected in the historical archive. The present technology achieves this goal by leveraging key features of relational query processing in a unique way, in the streaming context.

The present technology implements techniques from data-parallel processing paradigms. The approach described herein processes arbitrary partitions of an input stream in an isolated fashion independent of each other. At the heart of this approach is the concept of partial processing. More precisely, the partial processing of independent partitions of data produces partial results that can then be consolidated to produce final results for the queries. The consolidation can take place either immediately for a live CQ or on-demand when a portion of the archive is actually queried as part of either a live CQ or a historical SQ.

When the system's input manager receives data that is older than an already emitted progress indicator (i.e., tuples that arrive after the appropriate window has closed) the system organizes a separate partition for the data and processes this partition through a new instance of the original query plan. This new plan instance is automatically created on the fly by the system whenever a new partition is formed. Each individual partition is processed using standard OOP techniques where the input manager ensures that all tuples sent to a given partition can be safely processed without being discarded.

The system can maintain an arbitrary number of concurrent partitions and associated query plans. In some embodiments, the present technology may use some heuristics and maintain no more than a handful of active partition—if there is no progress on a given partition, it is sent heartbeats to complete its processing and then eliminated. In general, when a new tuple arrives and is seen as being too late to process for the original partition, there can be several partitions that are candidates for the tuple and the system therefore can employ a simple rule to choose an appropriate partition: it picks the partition whose latest data is closest to the new tuple.

FIG. 4 demonstrates the use of order-independent partial processing with the same data set shown earlier in FIG. 3, which resulted in six out-of-order tuples being discarded. In FIG. 4, three columns each representing the state of an individual partition are displayed. The behavior in the first window is identical to that of the OOP approach described earlier and the result returned in this example is identical to that shown in FIG. 3. In the second window, however, arrival of the out-of-order tuple with timestamp 2 (row 9) causes the system to spin up a second partition. When the out-of-order tuple with timestamp 3 arrives during that same window, it is handled in the second partition, as it is still in-order relative to that partition.

When the tuple with timestamp 8 (shown in row 15 in the figure) comes in during the third window, its timestamp is high enough to cause the open window of the second partition to close, producing a partial result of (2,5) and processing the new tuple in the second partition associated with the second window ending at time 10. When the next two tuples (at rows 16 and 17) with timestamps 4 and 3 come in, they are too late to be processed in the second partition and require the system to spin up a third partition where they are sent. Next, the tuple with timestamp 9 (row 18) comes in and is sent to the second partition. When the system receives a control tuple with timestamp 15 it flushes the second and third partitions producing partial results of (2,10) and (2,5). Now if as in the example of FIG. 3, the output of this query was rolled up into a super-query computing a tumbling window count with a "15 minute" window, using this Order-Independent Partial Processing method, the first output of the super-query will in fact be (16,15)—the correct answer.

Techniques for combining partial results to form final results are used in parallel systems ranging from MPP databases (for example, as described in DeWitt, D., Gray, J. Parallel Database Systems: The Future of High Performance Database Systems. CACM 35(6) 1992) to MapReduce (MR) (for example, as described in Dean, J., Ghemawat, S. MapReduce: Simplified Data Processing on Large Clusters. OSDI 2004) implementations.

There are, however, differences in the way the present technology applies this technique compared to how it is done in these prior types of systems. In systems like MPP databases and MapReduce, the partial processing (e.g., the map in MR) is immediately followed by the consolidation (e.g., the reduce in MR): the two phases are tightly integrated whether by being placed in the same thread of execution (in MPP databases) or more loosely integrated using intermediate files (in MR systems). In contrast, in our approach the present technology decouples these two phases. That is, consolidation may be applied lazily, when results are needed. Lazy consolidation on an on-demand basis is sufficient for an SQ or portions of a CQ that operate on archived histories, and is accomplished by using a set of novel query rewrites and views. In order to evaluate CQs over parallelized derived streams, however, consolidation across multiple concurrent stream partitions happens in runtime on an online basis.

Apart from being a critical building block of the present order-independent system, the present partial processing approach is particularly appealing because: (a) it is an ideal fit for the Big Data world where data often comes in the form of chunks of data that are in order but where any individual chunk may arrive significantly late and (b) it is naturally amenable to parallelism in general and scale-up in particular since each partition is processed independently by a separate dataflow, making it very easy to exploit modern multi-core and many-core hardware.

The innovative query rewrite technology of the present technology may be discussed with examples. First, the present technology may check if a query can operate in terms of partial aggregates and if so transform it appropriately. Next, the system generates views that encapsulate deferred consolidation of partial aggregates. The system may then focus on more complicated scenarios where a query has to be broken up to operate in partials form. Finally, the system may consider how to rollup partials via successive reduction—a form of consolidation that leaves the results in partial state. The rewrites involve various transformations of queries submitted to the system. In an exemplary embodiment, the CQ backend 120 may determine if a query can operate in terms of partial aggregates using a listing of predetermined functions stored in memory (e.g., a "white list"). Similarly, the CQ backend 120 may also determine if a query CANNOT operate in terms of partial aggregates because it represents a composition of aggregates (e.g., MAX over SUM) that is part of an exclusions list of predetermined function compositions stored in memory (e.g., a "black list"). These transformations enable the queries to correctly execute over streams that are dynamically partitioned. Relational views (both static and streaming) are then put in place to hide the underlying partitioning from query writers and application developers. That is, queries are written assuming traditional, in-order streams, even though the streams may actually be made up of overlapping partitions, created by the late data handling mechanisms of the previous section, or for other reasons related to parallelism, distribution, fault tolerance or high-availability.

The present technology may process aggregate queries, which may be a most common use case. More specifically, the system may consider distributive (e.g., max, min, sum, and count) as well as algebraic (e.g., avg) aggregates as classified by Gray et al. See, Gray, J., et al. Data Cube: A Relational Aggregation Operator Generalizing Group-by, Cross-Tab and Sub-Total. In ICDE 1996. These are typical aggregates in database systems, and can be computed using final aggregation over partial aggregates over disjoint partitions of their input, a technique used with parallel databases (e.g., Bubba: Bancilhon, F., et al. FAD, a powerful and simple database language. In VLDB 1987) as well as streaming systems (e.g., STREAM, Telegraph etc.). In general, the functions used for the partial aggregates can be different from those for the overall aggregate.

The approach described below implements aggregation functions using three kinds of aggregates. A partial aggregate runs over a partition of base data, and computes an intermediate result (or "partial state record") for that partition. A reduce aggregate runs over a set of partial state records and produces another partial state record, which summarizes its input. A final aggregate runs over a set of partial state records and produces a final result, of the same type as the originally specified aggregation function.

| Aggregate Fn | Implementation |
| --- | --- |
| count(x) | |
| count_partial(x) | count(x) |
| count_reduce(c) | sum(c) |
| count_final(c) | sum(c) |
| avg(x) | |
| avg_partial(x) | <sum(x), count(x)> |
| avg_reduce(<s,c>) | <sum(s),sum(c)> |
| avg_final(<s,c>) | sum(s)/sum(c) |

The chart above shows three kinds of aggregates (partial, final, and reduce) that are associated with each of the count and avg aggregate functions. In the case of count there is no last step for the final aggregate since the intermediate state is itself the answer and therefore the final and reduce aggregate are identical: the sum aggregate function. In the case of avg, however, the final aggregate is different from the partial aggregate. The partial state produced by each separate avg_partial is in the form of <sum,count> pairs. While these can be rolled up to get an actual average using the avg_final aggregate, they can also be rolled up into a single <sum, count> pair. In general, if it is possible to express any aggregate using partial and final aggregates, it is also possible to derive the reduce aggregate by leaving out the last "finalization" step of the final aggregate.

By using this partial aggregation approach with the query and view rewrites, the present system is able to run in "partial aggregation mode" as its normal mode of operation. Since partial aggregation allows computation to be done over different partitions independently, this approach enables handling very late data simply by dynamically creating partitions as described in the previous Section. Partial aggregation results are computed as data arrives and are stored in their partial state. Results are then finalized on demand at runtime, using the reduce and final aggregate functions. In addition, by using the rewrites herein described, query writers (whether human or algorithmic) can code without any concern for such partitioning.

An example may start with a simple scenario modeling clickstream data for online advertising (see FIG. 5) with a raw stream called impsns (short for "impressions") where each tuple records the fact that an ad from a certain campaign was shown to a given user at a specified price and time. There is also a derived stream (i.e., a stream that is defined as the results of a CQ) called impsn_count that contains the number of ad impressions for each campaign over successive "1 minute" slices using a straightforward grouped aggregate query whose results are archived into a table called impsn_count_ar.

The first step of the rewriting process is to determine whether or not the query that produces impsn_count can be rewritten in a partial aggregation form. This check is substantially similar to decisions made in a query optimizer for a parallel RDBMS. In this case, the computation in question (the count(*) aggregate function) can be split into two phases: a partial phase that computes a per-campaign count for each individual run, and a final phase that consolidates these results across all runs (by summing the per-run per-campaign counts on a per-campaign basis) to compute global per-campaign counts across runs. The first part of this split is accomplished by creating a derived stream of partial aggregations as shown in FIG. 6.

While in this case the CQ on which the system-generated stream i_c_p is based is identical to that of the original user-created stream impsn_count, the rewrite is still necessary for two reasons. First, the partial aggregate function and the resulting per-run aggregate values could be different from the original aggregate function when using aggregates such as avg (see Section 4.5), as opposed to the count(*) used in this example. Second, a new name for the stream is required because the system generated i_c_p stream contains the results of the partial phase, i.e., per-campaign counts on a per-partition basis and not what the user originally defined in the impsn_count stream.

Recall that a key requirement of the present rewriting approach is that there should be no changes required to application-level code. Thus, part of the rewriting process is to create special static and streaming views with names identical to that of the original stream and archive, which hide the rewriting of the original stream. In the advertising example, such views (FIG. 7) consolidate the per-partition per-campaign counts across all independent and possibly concurrent partitions in order to compute the per-campaign counts for each 1 minute slice, as would have been produced by the original query. As a result, applications require no modifications; they query the views just as if they were dealing with the original user-created stream and table objects, unaware of any rewrites.

It should be noted that these consolidated views are not materialized, so that final aggregation happens on demand in response to the execution of a query over one of these views. When an application issues a query on impsn_count_ar associated with the impsn_count stream it is actually issuing a static query against the impsn_count_ar view, which in turn is rewritten automatically by the system to operate on the i_c_p_ar object. Similarly, if an application issues a live continuous query on the results of the impsn_count stream (as originally defined) it is actually posing an appropriate continuous query over the impsn_count streaming view. In response, the system rewrites the reference to impsn_count to include the definition of the view, which in turn consolidates results from multiple concurrent runs.

The definitions of both views merely involve the use of the reduce aggregate function (sum in this case) to combine the partial aggregate results produced by the i_c_p stream. One nuance is in the impsn_count_ar static view where the timestamp column t is included in the group by clause. This is in order to combine partial results of a given window. Note that the column t is actually populated by the cq_close(*) aggregate function in the rewritten derived stream i_c_p.

In a more complicated example, only parts of a query may be amenable to partial processing. In such cases, it is often possible to carve out a sub-query block that can be written in data parallel mode. The system may identify the dividing line between the sub-query and the rest of the query as a "gather" point. A gather point corresponds quite closely to points in parallel DBMS query plans where results from various nodes need to be brought together. This approach can be demonstrated using examples of individual derived streams written on top of impsn_count and identify cases where these second order streams are candidates for the partial transformation.

Our example may begin with the stream impsn_sum (FIG. 8) that computes the total number of impressions across all campaigns over successive 1 minute slices. It turns out that this stream can indeed be rewritten with the partials transformation shown earlier because it is possible to compute partial aggregates for the sum function over partial aggregates of the underlying count function. In this case, impsn_sum would be automatically rewritten to operate over the previously generated stream of partials i_c_p as opposed to the consolidating streaming view impsn_count. Note that this happens although impsn_sum is declared to be over impsn_count, because (as shown above) impsn_count is actually a view.

Next, the present system may consider the create statements for streams impsn_max and impsn_thresh shown in FIG. 9, neither of which can be rewritten using this technique. In the case of impsn_max (which, computes the maximum number of impressions across all campaigns in successive 1 minute slices) this is because the aggregate function "max" cannot be composed on top of the underlying count since the max of partial counts for various groups in a single partition is not the same as the max of the complete counts for the various groups across partitions. More formally, let there be n distinct campaigns, k partitions of data, leading to the ith partition producing partial counts $ci1, ci2, \ldots, cin$ for each of the n campaigns. In this case, deploying impsn_max using the partial parallel processing rewrite would end up computing max(max(c11, ..., c1n), max(c21, ..., c2n), ..., max(ck1, ..., ckn)) as the result value instead of the correct answer which is max(sum(c11, c21, ..., ck1), sum(c12, c22, ..., ck2), ..., sum(c1n, c2n, ..., ckn)). More generally, there are legal compositions (e.g., sum on top of count) and illegal compositions (e.g., max on top of count) that the system tracks in order to determine which rewrites are legal.

The situation for impsn_thresh (which returns the campaigns that have impression counts exceeding a threshold of 50 over successive 5 minute windows) is similar—the expression in the having clause must be evaluated after the partial results are consolidated.

Another example may be discussed which considers the use case of rollups where the user's intent is to compute the same aggregate at various levels in a hierarchy.

Although the stream impsn_count_5 min (FIG. 10) computes per-campaign counts over successive 5 minute slices and is written directly against the raw stream impsns, it is clearly a candidate to be rewritten over the derived stream impsn_count which computes the identical measure over successive 1 minute slices. It's easy to see how impsn_count_5 min can exploit partial rewrites: compute per-campaign partial counts over a 5 minute window by adding up the constituent partial counts of 1 minute windows. In other words, the rollup involves combining partial results to form other partial results for the same exact aggregate function.

Things are considerably more complex, however, if the avg aggregate function is used in place of count in the impsn_avg and impsn_avg_5 min streams as shown in FIG. 11.

In such a situation, the rewrite of the lower-level stream would use the avg_partial aggregate, which returns a composite type consisting of a <sum,count> pair. The consolidating views would thus use the avg_final final aggregate to roll up these pairs to produce an actual average on demand. The rewritten higher level stream must, however, combine partial values produced by avg_partial (a set of <sum,count> pairs) and produce a result which is also in the partial form (a single <sum,count> pair). Therefore, this requires the higher-level stream to be rewritten using the reduce aggregate (avg_reduce in this case), which performs the partial state to partial state reduction. These rewrites are shown in FIG. 12.

In situations where there are large amounts of out-of-order data, the approaches described herein may result in large numbers of different partial state records for a given window. This is especially true if query windows are relatively small since such windows are more likely to close before the late data is processed, thereby triggering fresh partitions which in turn cause more partial state to be written out. Large numbers of partial state records increase the cost of evaluating the consolidating views. The present system therefore may use a background process that periodically employs the "reduce" aggregate to keep the partial state small. Note that the present system may use the reduce aggregate for two reasons: (a) the reducer updates the contents of a partial archive operating over partial state records and must therefore also generate partial state records, and (b) there may be extremely late data which only arrives after the background reducer has summarized some partials and so the on-demand consolidating views will need to combine the latest new partials from the late data with the reduced partials from earlier data. Thus the reducer's contract is to keep the data in partial aggregate form for deferred on demand consolidation.

The present system may combine parallel processing with serial processing streams. The overall architecture of the system can be used to realize the order-independent processing model as described herein in order to provide guaranteed order independence.

The data-parallel approach described above offers a powerful new processing model for handling discontinuity in data thereby enabling the development of a scalable and reliable system. In some embodiments, this approach may not be utilized for the following two reasons: there can be a need for live CQs that are able to consolidate partial results on the fly and provide immediate alerts, often by comparing the combined data with historical values; and just as not all query operators in an MPP database system can be parallelized, not every CQ operator is amenable to the partial processing idiom. In fact the operators for which parallelization is effective are the ones for which partial processing is most applicable.

The two reasons suggest that a solution may combine the parallel processing model with the traditional serial-processing approach, while still offering order-independent behavior to applications. Supporting the latter is particularly challenging and may be vital in building a scalable and reliable system as explained earlier in Section 2.2.

In the case of PP streams, the present system achieves order-independence for "free". For SP streams however, the technique of implementing order-independence is based on processing very out-of-order data (too late for OOP) by periodically repairing any affected archived SP data. The archives are therefore guaranteed to be correct with respect to out-of-order data on an eventual consistency basis. The mechanics involve two pieces: (a) spooling all tuples that arrive too late into an auxiliary structure (a system-generated corrections table), and (b) a CQ repair process that periodically scan records from the auxiliary table and combines them with an appropriate portion of originally arrived tuples in order to be able to recompute and update affected portions of archived SP data. This approach is different from the dynamic revision of query results in Borealis (for example, as described in Abadi, D., Ahmad, Y., Balazinska, B., et al. The Design of the Borealis Stream Processing Engine. In CIDR 2005)—for example the system updates the archives of streams in response to late data, whereas Borealis updates the results of a streaming query.

A unit of work, or a transaction (for example, as described in Gray, J., Reuter, A. Transaction Processing: Concepts and Techniques. Morgan Kaufmann 1993, ISBN 1-55860-190-2), is generally associated with the well-known ACID properties: atomicity, consistency, isolation and durability. The present system focuses on atomicity and durability and has addressed isolation and consistency in earlier work. Durability is typically important in order to be able to recover state after a crash. Atomicity is typically important in order to more easily undo the effects of failures in either individual applications or the system. In fact, these properties are the key to the typical way in which data is loaded into analytic systems where the loading application batches up a data set and loads it in a single UOW. This model may be used in connecting a transactional message queue with the streaming system in a manner that guarantees that no records can ever be lost.

The idiom described above depends on the ability to abort a data loading transaction—either based on an error condition (e.g., in the loader, network, or system) or because the loader chose to abort the transaction for whatever reason. On abort it is vital that all modifications to raw and derived stream histories must be rolled back, at least eventually. It is very challenging to support this abort requirement in a pure streaming system because (a) waiting until data is committed before processing leads to significant extra latency and defeats the purpose of a streaming system, and (b) commingling and then processing dirty uncommitted data from multiple transactions makes it hard to unwind the effects of a single transaction. The latter is particularly hard because archiving of SP streams is the responsibility of separate Archiver threads that run in their own transactions and are independent of the Backend thread that manages the UOW in which data is loaded.

The present system provides a solution to this problem in two parts: (a) the system pushes down the partial processing of CQs (and archiving query results) to the input manager thread that handles the data loading transaction, and (b) the present system organizes the data-loading application into several, possibly concurrent, units of work each of which loads one or more chunks of data called "runs". More precisely, a "run" is a finite sub-part of a stream that arises naturally as a by-product of the way that data is collected and sent to a streaming system. Typically, individual systems (e.g., application servers or web servers) spool data into log files they keep locally. These log files are often split at convenient boundaries based on number of records, size, or time (e.g., 50K records, every two minutes, etc.) and are then sent separately to the stream-processing engine. In the present system, the files may actually be bulk-loaded through standard interfaces such as JDBC/ODBC. Such log files serve as natural units for "runs", with clear boundaries. In other situations, where data is sent in a true streaming fashion, a run can be created by periodically committing the data-loading transaction—a mechanism that is akin to inserting punctuation records indicating when a run begins and when it ends.

The database recovery problem (for example, as described in, Gray, J., Reuter, A. Transaction Processing: Concepts and Techniques. Morgan Kaufmann 1993, ISBN 1-55860-190-2; See, Mohan, C., Haderle, D., et al. ARIES: A Transaction Recovery Method Supporting Fine-Granularity Locking and Partial Rollbacks Using Write-Ahead Logging. ACM TODS 17(1): 94-162 (1992)) is generally defined in terms of bringing the system back up to a sane and consistent state after a crash when all in-flight transactions during the crash are deemed aborted. The recovery of archives of PP streams comes for "free" since all writes of raw and corresponding derived data happen as part of the same transaction. The present system benefits not only from the robust recovery architecture of the underlying PostgreSQL storage subsystem but also from other enterprise-class features of PostgreSQL such as online backup mechanisms.

Recovery for serial processing is a more challenging requirement because of the large amounts of runtime state managed in main-memory structures by the operators in the CQ executor as well as the decoupled nature in which durable state is written out originally by the CQ archiver. Crash recovery therefore typically involves three steps: (a) standard database style recovery of all durable state, (b) making all SP archives self-consistent with each other and the latest committed data from their underlying archive and therefore the archive of the raw stream, and (c) rebuilding the runtime state of the various operators in the CQ executor. The CQ executor can then be declared to be "open for business" again.

The ability to have a robust recovery implementation that is capable of quickly recovering from a failure is important. Furthermore, the longer it takes to recover from a failure, the more the amount of pent-up data that has gathered and the longer it's going to take to catch-up to live data.

The system described herein provides the ability to offer a strong guarantee about the atomicity and durability of any and all data loaded into a system within a single UOW without compromising on immediate processing of data. This calls for speculatively processing dirty uncommitted data in a laissez-faire fashion based on the assumption that errors and transaction aborts are few and far between. When a transaction is actually aborted the system will asynchronously repair the associated SP archives in a manner similar to how repair guarantees order-independence on an eventual consistency basis. Such speculative processing may be performed by the CQ repair module 170. The CQ repair module 170 may, for example determine that the partial results need to be recalculated from at least one of the one or more partitions based upon a transaction rollback indicator. A range of tuples may then be identified that need to be replaced in the memory module using the transaction rollback indicator in conjunction with an underlying metadata structure. Finally, the identified range of tuples may be reprocessed.

While the data-parallel approach of the present technology provides a natural path to scalability, the present system may be enhanced in order to provide for Fault-Tolerance (FT) and High-Availability (HA). As used herein, FT may be the ability of a system to react well from some kind of extreme or catastrophic error—whether in the streaming engine itself, in the application, or in some aspect of the hardware and/or software environment. In particular, quick recovery from a failure state is critical in realizing FT. HA may be characterized as the ability of a system to remain up even in the face of a catastrophic error. HA is generally realized using additional back-up resources that are organized together in either an "active-standby" or "active-active" configuration.

The UOW and Recovery functionality sketched above serve as key building blocks for HA and FT in the present system. The present system implementation supports a comprehensive HA/FT solution by organizing a cluster of nodes in a multi-master active-active configuration.

In this setup, the same CQs are typically running on all nodes of the cluster. Any incoming run of data can be sent to any—but only one—node in the cluster. It is then the responsibility of a special stream replicator component in each node to communicate the complete contents of each run to the peers in the cluster. The runs of data that are populated into a stream by a peer are treated just like any other incoming data except for one thing—they are not further re-replicated to other nodes.

The present model is one of eventual consistency—in other words, the run replication procedure happens on an asynchronous basis and not part of each commit of a UOW. The only downside of eventual consistency is the very small risk of data loss in the event of any catastrophic media failure between a run getting committed and replicated to a peer.

It is important to understand the critical role that the present order-independent infrastructure plays in realizing a simple and sane HA/FT architecture. Since each individual node in the cluster can accept data in any order whatsoever, the different nodes can stay loosely coupled and implement simple and easy to verify protocols. Additionally, when a node recovers from failure it is immediately able to start accepting new transactions and patch up the data it has missed asynchronously. In contrast, alternative approaches to FT such as Borealis require that a node recovering from failure refuse new clients until it has processed enough data to reach a consistent state.

On failure of a node in the cluster it is the responsibility of the application layer to direct all CQs and SQs to other nodes. Furthermore, after the failed node is brought back online it needs to capture all the data that it missed while being non-functional. This is also accomplished by the replicator component using a simple protocol that tracks the runs that have and have not been replicated.

When a live CQ is added to a streaming system on an ad hoc basis, it is easiest for the query to only see data that arrives in the system after the query is submitted. This easy approach is quite reasonable if the query in question involves small windows (e.g., a window over the last 5 seconds that advances every 5 seconds). In many situations, however, this is not the case (e.g., a sliding window over the last 24 hours that advances every minute) and a naïve streaming implementation will not produce complete results until steady state (24 hours in the example) is reached.

The system provides a feature called "bootstrapping", which is the ability to exploit any available archives of the underlying raw or derived stream that the CQ is based on by reaching into the archive and replaying history in order to build up the runtime state of the query and start producing complete results as early as possible.

In addition, if a new CQ has an associated archive there is often a need for the system to populate this archive with all the data already in the system prior to the query's addition. This feature may be called "nostalgia." When specified, the present system may asynchronously catch-up the associated SP archives in a manner similar to how repair enforces order-independence.

Figure 13:
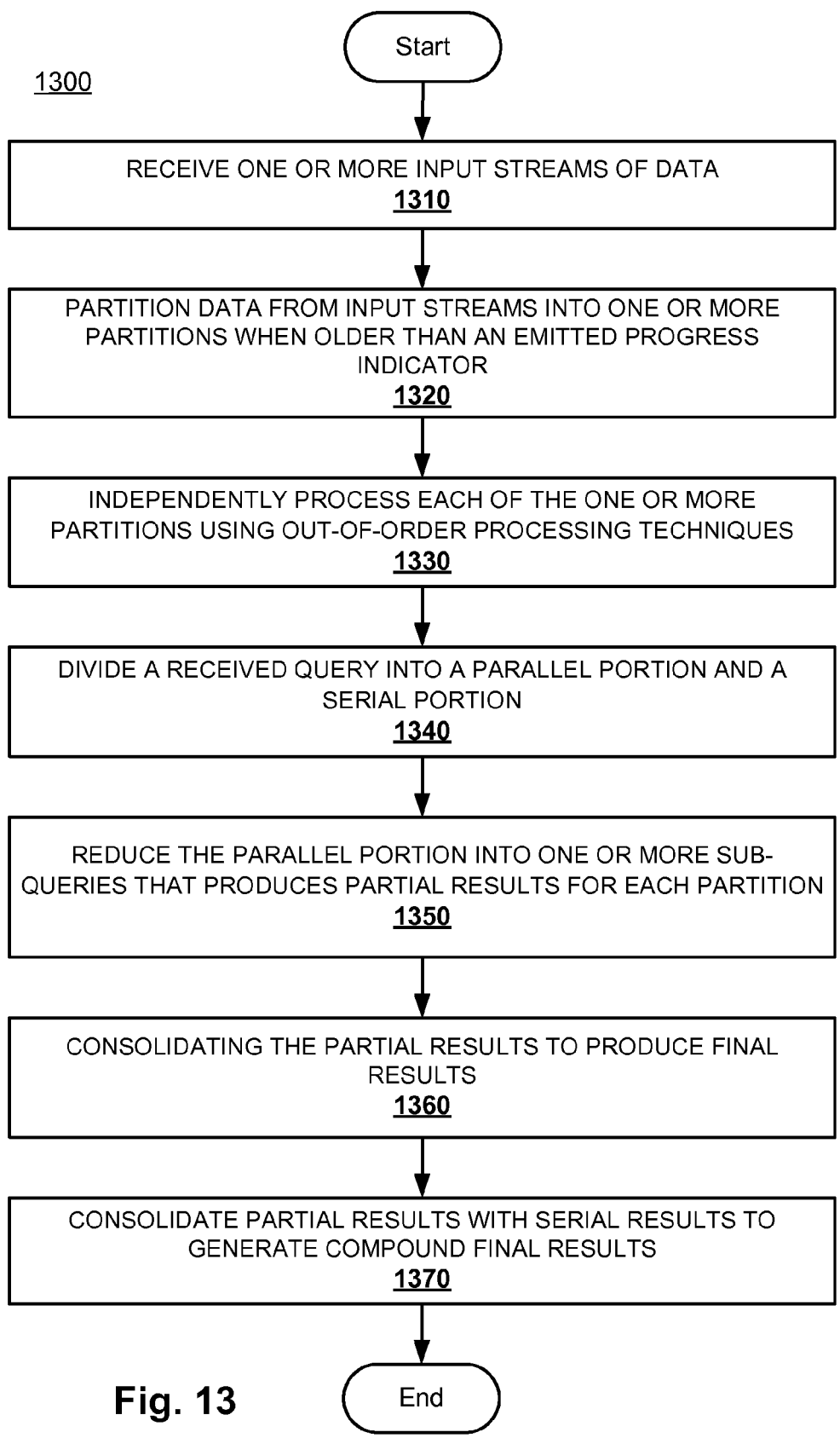
FIG. 13 is a flowchart of an exemplary method for providing order-independent stream query processing.

FIG. 13 is a flowchart of an exemplary method for providing order-independent stream query processing. The method of FIG. 13 may be performed by system 100, for example. At step 1310, one or more input streams of data are received. The one or more input streams are analyzed to determine data which is older than an already emitted progress indicator. At step 1320, the data older than the already emitted progress indicator is partitioned into one or more partitions. Each of the one or more partitions is independently processed, using out-of-order processing techniques, at step 1330. Processing the queries is discussed in more detail below with respect to the method of FIG. 14.

At step 1340, a query is received and divided into a parallel portion and a serial portion. The parallel portion of the query is amenable to partial processing, while the serial portion of the query is processed serially (e.g., by continuous query executor 130).

At step 1350, the parallel portion of the query is reduced into one or more sub-queries that produce partial results for each of the one or more partitions and a view that consolidates the partial results for each partition. Each of the one or more sub-queries corresponds to a partition. Reducing the parallel portion into one or more sub-queries may be performed by rewriting the parallel portion or decomposing the parallel portion (e.g., a query Q) into partial queries (e.g., sub-queries Q').

The partial results may be consolidated at a consolidation time specified by the query to produce final results at step 1360. For example, the query may request that consolidation be performed at five-minute intervals. The consolidation time for such an exemplary query would be five minutes after processing of the query began.

Meanwhile, the serial portion of the query may be evaluated to produce serial results. The evaluation may be performed, for example, by the continuous query executor 130. The parallel results and the serial results may be combined to produce compound final results at step 1370, which may be provided to back ends 180 in an exemplary embodiment and/or stored to memory module 140. In embodiments where there is no serial portion of the query, the final results may subsequently be provided (e.g., to back ends 180).

Figure 14:
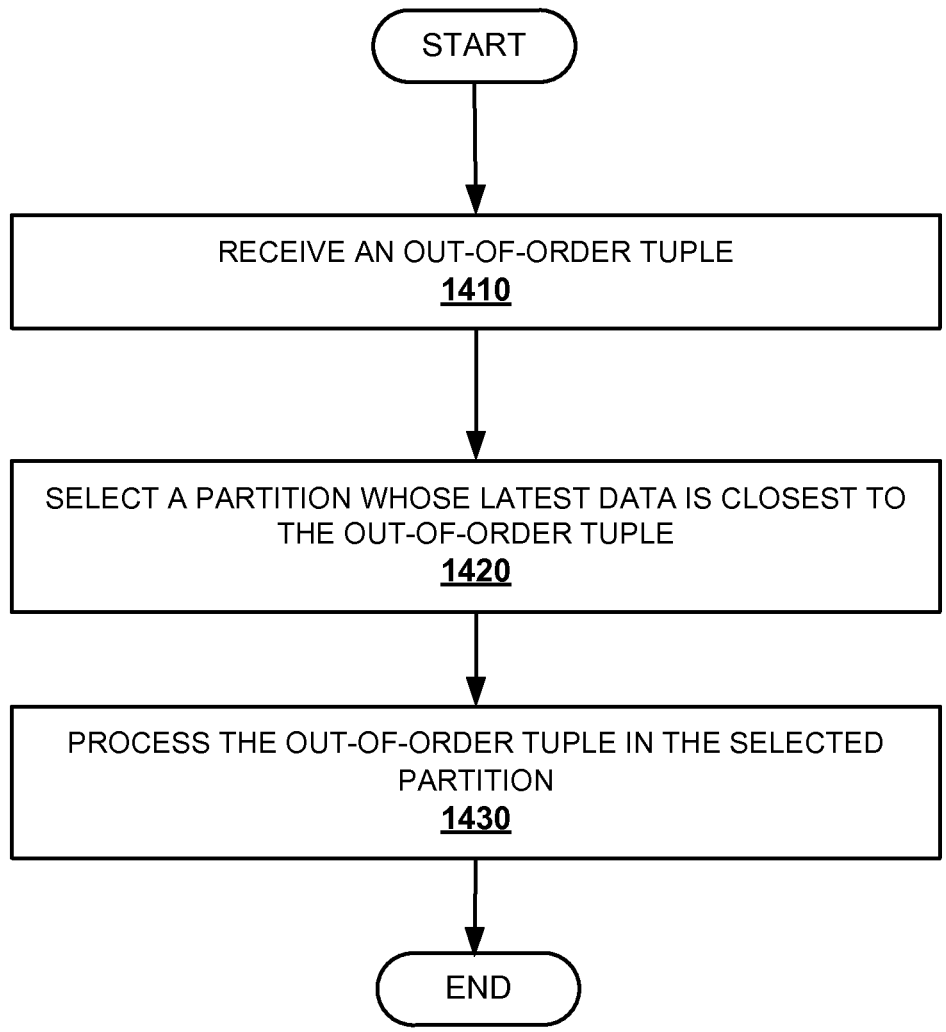
FIG. 14 is a flowchart of an exemplary method for processing out-of-order data.

FIG. 14 is a flowchart of an exemplary method for processing out-of-order data. The method of FIG. 14 may provide more detail for step 1330 of FIG. 13.

An out-of-order tuple is received at step 1410. In an exemplary embodiment, the out-of-order tuple may be received or processed too late to process for an original partition, and must therefore be processed in a different manner. A partition is selected whose latest data is closest to the out-of-order tuple in step 1420. The out-of-order tuple is then processed as described above in the selected partition at step 1430.

The present technology is described above with reference to exemplary embodiments. It will be apparent to those skilled in the art that various modifications may be made and other embodiments can be used without departing from the broader scope of the present technology. Therefore, these and other variations upon the exemplary embodiments are intended to be covered by the present technology.

The invention claimed is:

1. A method for order-independent stream query processing, the method comprising:
   partitioning received data into one or more partitions;
   decomposing a received query into one or more sub-queries that can operate on independent partitions to produce partial results for each partition and a view that consolidates the partial results for each partition;
   receiving an out-of-order datum, the out-of-order datum being too late to process for an original partition;
   selecting a partition whose latest data is closest to the out-of-order datum;
   processing the out-of-order datum in the selected partition;
   consolidating the partial results on a continuous basis to produce final results; and
   reporting the final results;
   wherein the method is performed by one or more computing devices.

2. The method of claim 1, the view including a streaming view.

3. The method of claim 1, the view including a non-streaming view.

4. The method of claim 1, further comprising closing a partition when no progress is made in the partition over a predetermined time interval and a heartbeat is received.

5. The method of claim 1, further comprising closing a partition when predetermined conditions are satisfied.

6. The method of claim 1, the query including a parallel portion and a serial portion, the method further comprising:
   decomposing the query into the parallel portion and the serial portion, the parallel portion of the query being amenable to partial processing;
   rewriting the parallel portion into the one or more sub-queries;
   evaluating the serial portion of the query to produce serial results;
   combining the parallel results and the serial results to produce compound final results; and
   providing the compound final results.

7. The method of claim 1, the view including one or more relational views that encapsulates deferred consolidation of partial aggregates.

8. The method of claim 1, the consolidating the partial results including deriving a partial aggregate, the partial aggregate comprising a partial state record for a partition.

9. The method of claim 1, the consolidating the partial results comprising deriving a final aggregate, the final aggregate being derived from one or more partial state records, the final aggregate comprising a final result.

10. The method of claim 1, further comprising:
    consolidating the partial results on continuous basis to produce final results;

in the case of final results feeding a serial path stream, categorizing the partial results as being too late to process for serial path queries;

store the late partial results into auxiliary correction tables for asynchronous processing; and performing a repair process that periodically scans records from the auxiliary tables and combines them with an appropriate portion of originally arrived records.

11. The method of claim 10, further comprising:

detecting an aborted transaction while processing received data;

using the repair process to repair ranges of serial path data that was received as part of the aborted transaction.

12. A non-transitory computer readable storage medium storing instructions, which when executed by one or more processors, cause the one or more processors to perform:

partitioning received data into one or more partitions;

decomposing a received query into one or more sub-queries that can operate on independent partitions to produce partial results for each partition and a view that consolidates the partial results for each partition;

receiving an out-of-order datum, the out-of-order datum being too late to process for an original partition;

selecting a partition whose latest data is closest to the out-of-order datum;

processing the out-of-order datum in the selected partition;

consolidating the partial results on a continuous basis to produce final results; and reporting the final results.

13. The non-transitory computer-readable storage medium of claim 12, the view including a streaming view.

14. The non-transitory computer-readable storage medium of claim 12, the view including a non-streaming view.

15. The non-transitory computer-readable storage medium of claim 12, further comprising instructions which when executed cause closing a partition when no progress is made in the partition over a predetermined time interval and a heartbeat is received.

16. The non-transitory computer-readable storage medium of claim 12, further comprising instructions which when executed cause closing a partition when predetermined conditions are satisfied.

17. The non-transitory computer-readable storage medium of claim 12, further comprising instructions which when executed cause:

decomposing the query into the parallel portion and the serial portion, the parallel portion of the query being amenable to partial processing, the query including a parallel portion and a serial portion;

rewriting the parallel portion into the one or more sub-queries;

evaluating the serial portion of the query to produce serial results;

combining the parallel results and the serial results to produce compound final results;

providing the compound final results.

18. The non-transitory computer-readable storage medium of claim 12, the view including one or more relational views that encapsulates deferred consolidation of partial aggregates.

19. The non-transitory computer-readable storage medium of claim 12, further comprising instructions which when executed cause the consolidating the partial results including deriving a partial aggregate, the partial aggregate comprising a partial state record for a partition.

20. The non-transitory computer-readable storage medium of claim 12, instructions which when executed cause the consolidating the partial results comprising deriving a final aggregate, the final aggregate being derived from one or more partial state records, the final aggregate comprising a final result.

21. The non-transitory computer-readable storage medium of claim 12, further comprising instructions which when executed cause:

consolidating the partial results on continuous basis to produce final results;

in the case of final results feeding a serial path stream, categorizing the partial results as being too late to process for serial path queries;

store the late partial results into auxiliary correction tables for asynchronous processing;

performing a repair process that periodically scans records from the auxiliary tables and combines them with an appropriate portion of originally arrived records.

22. The non-transitory computer-readable storage medium of claim 21, further comprising instructions which when executed cause:

detecting an aborted transaction while processing received data;

using the repair process to repair ranges of serial path data that was received as part of the aborted transaction.

23. The method of claim 1, wherein the out-of-order datum is a tuple.

24. The non-transitory computer-readable storage medium of claim 12, wherein the out-of-order datum is a tuple.

* * * * *